United States Patent [19]
Horikiri

[11] Patent Number: 4,793,884
[45] Date of Patent: Dec. 27, 1988

[54] DECORATIVE PLATE PRODUCING METHOD

[75] Inventor: Yataro Horikiri, Tokyo, Japan

[73] Assignee: Wakaba Co., Ltd., Tokyo, Japan

[21] Appl. No.: 111,177

[22] Filed: Oct. 22, 1987

[51] Int. Cl.[4] .............................................. B32B 31/18
[52] U.S. Cl. .................................... 156/247; 156/248; 156/267; 156/268; 428/41
[58] Field of Search ............... 156/247, 248, 257, 268, 156/267, 249, 289, 306.6, 306.3; 434/84, 96; 446/901; 428/13, 41, 46, 47

[56] References Cited

U.S. PATENT DOCUMENTS

| | | | |
|---|---|---|---|
| 2,896,351 | 7/1959 | Johnson | 428/41 |
| 3,002,309 | 10/1961 | Snyder | 156/248 |
| 3,966,532 | 6/1976 | Harasta | 156/248 |

FOREIGN PATENT DOCUMENTS

| | | | |
|---|---|---|---|
| 46979 | 4/1977 | Japan | 156/247 |

*Primary Examiner*—Caleb Weston
*Attorney, Agent, or Firm*—Fleit, Jacobson, Cohn & Price

[57] ABSTRACT

A method of producing decorative plates including the steps of applying a bonding agent to the upper surface of a substrate of, for example, cardboard, bonding to the resultant upper surface of the substrate release paper having a silicone resin layer on its lower surface, cutting the release paper therethrough and the upper surface of the substrate to a small depth to thereby pattern the release paper and the substrate with a suitable figure, removing the portion of the release paper which is enclosed with the cut, applying decorative paper to the surface of the portion of the bonding agent which is left exposed after the above-described portion of the release paper has been removed, and cutting the decorative paper along the cut so as to remove the peripheral portion thereof.

4 Claims, 3 Drawing Sheets

DECORATIVE PLATE PRODUCING METHOD

BACKGROUND OF THE INVENTION

The present invention relates to a decorative plates which, if necessary, can be held in a picture frame and, more particularly, to a method of producing decorative plates which enables decorative figures or patterns to be formed very easily on a substrate thereof.

In a conventional pasted picture producing method, a suitable pattern is first drawn on a substrate, and then the same pattern on figured or colored paper in accordance with the figure drawn on the substrate. The figure is then cut out from the figured or colored paper and the cut-out figure is applied to the patterned portion of the substrate with a bonding agent, whereby a pasted picture is made.

However, in this pasted picture manufacturing method, it is difficult to draw a pattern, which is identical with that drawn on the substrate, on colored paper, and drawing such a pattern on the colored paper requires advanced techniques and a lot of time. In fact, it is next to impossible to draw a pattern, which is identical with that drawn on the substrate, on the figured or colored paper.

SUMMARY OF THE INVENTION

An object of the present invention is to provide a method of producing decorative plates which enables decorative figures and/or patterns to be formed clearly on a substrate.

Another object of the present invention is to provide a method of producing decorative plates which can be produced readily by children.

According to the present invention, there is provided a new method of producing decorative plates comprising the steps of applying a bonding agent to the upper surface of a substrate of, for example, cardboard, bonding to the resultant upper surface of the substrate release paper having a silicone resin layer on its lower surface, cutting the release paper therethrough and the upper surface of the substrate to a small depth to thereby pattern the release paper and the substrate with a suitable figure, removing the portion of the release paper which is enclosed with the cut, applying decorative paper to the surface of the portion of the bonding agent which is left exposed after the above-described portion of the release paper has been removed, and cutting the decorative paper along the cut so as to remove the peripheral portion thereof.

The substrate may be made of paper laminate composed of cardboard, or a single sheet of cardboard having a base plate composed of a wooden plate and bonded to the lower surface thereof. The decorative paper may preferably be made of Japan paper which is a special paper made with an irregular mottled effect on the surface. The base plate may be composed of a plate of a soft or hard synthetic resin, cardboard, corrugated board, a glass plate or a metal plate. Fluff which may be formed at the cutting step at the cut edge of the bonded portion of the decorative paper is forced into the groove which constitutes the above-described cut.

PREFERRED EMBODIMENT OF THE INVENTION

A preferred embodiment of the decorative plate producing method according to the present invention will now be described in detail with reference to the drawings.

Figure 1A:
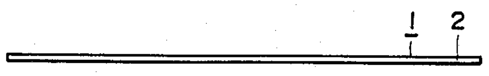
FIG. 1A is a front elevation of a substrate in an embodiment of the invention consisting of cardboard.
Figure 1B:
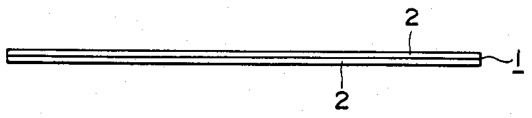
FIG. 1B is a front elevation of a substrate in modification consisting of paper laminate consisting of cardboard.
Figure 1C:
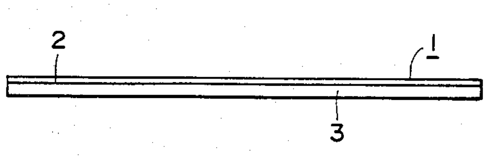
FIG. 1C is a front elevation of a substrate in further modification consisting of cardboard and having a base plate composed of a wooden plate or the like bonded to the rear surface of the cardboard.

With reference first to FIGS. 1A, 1B and 1C, three types of substrate 1 are shown in which FIG. 1A shows a substrate of cardboard 2, FIG. 1B a substrate of paper laminate made of cardboard 2 and FIG. 1C another type of substrate made of cardboard and having a base plate 3 composed of a wooden plate, a plate of a soft or hard synthetic resin, cardboard, corrugated board, a glass plate, or a metal plate. A bonding agent 4 composed of an acrylic resin is applied to the upper surface of the substrate 1 and release paper 5, which is called also as strippable paper or peelable paper, the lower surface of which is coated with a silicone resin 6, is bonded to the upper surface of the substrate 1.

Figure 2:
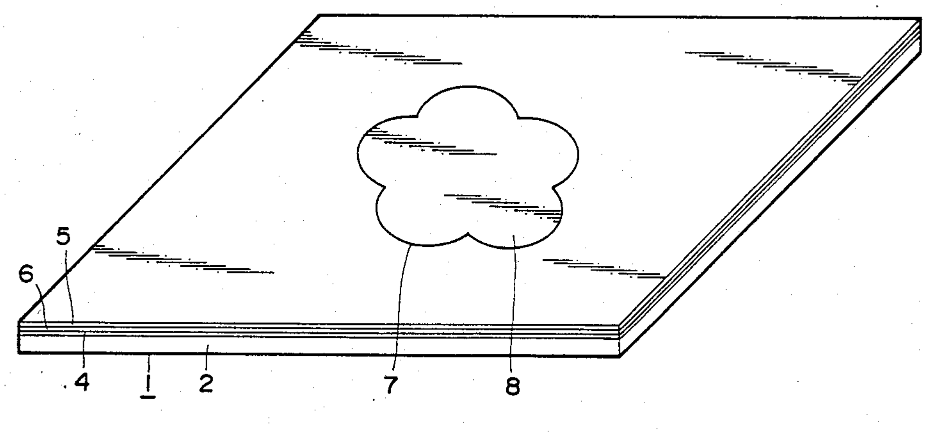
FIG. 2 is a perspective view of a first semi-product in which release paper the lower surface of which is coated with a silicone resin is applied to the surface of a bonding agent applied to the surface of a bonding agent applied to the upper surface of a substrate with a figure cut through the release paper and into substrate.
Figure 3:
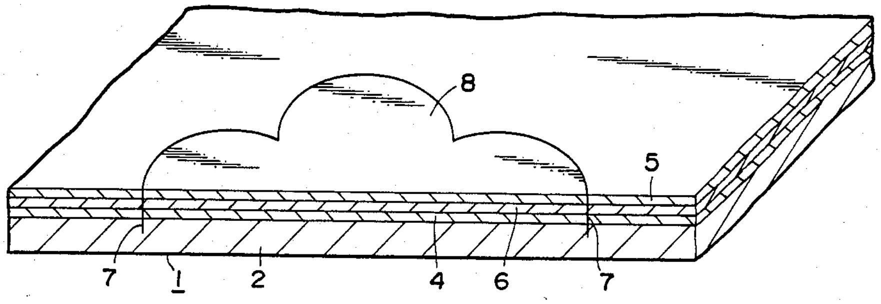
FIG. 3 is an enlarged longitudinally sectioned perspective view of a part of the first semi-product.
Figure 4:
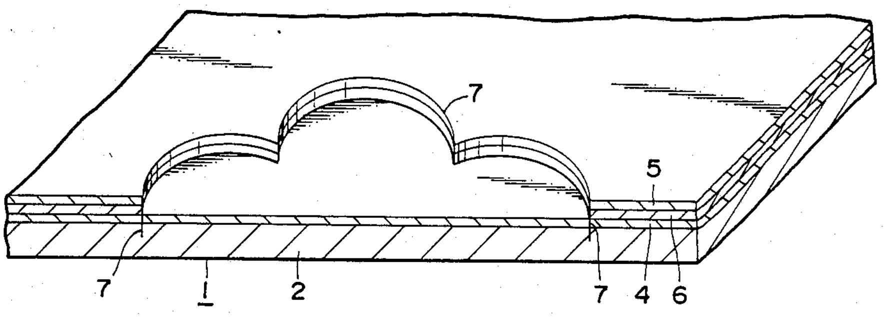
FIG. 4 is an enlarged longitudinally sectioned perspective view of a part of a second semi-product in which the portion of the release paper which is enclosed with the cut is removed.
Figure 5:
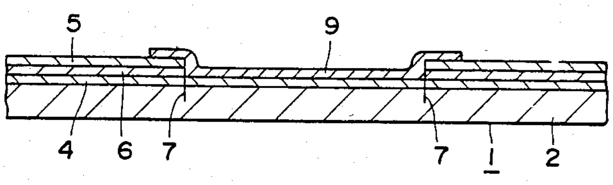
FIG. 5 is an enlarged longitudinally sectioned front elevation of a part of a third semi-product in which decorative paper (e.g. Japan paper) is applied to the surface of the portion of the bonding agent which is left exposed after the above-described portion of the release paper has been removed.
Figure 6:
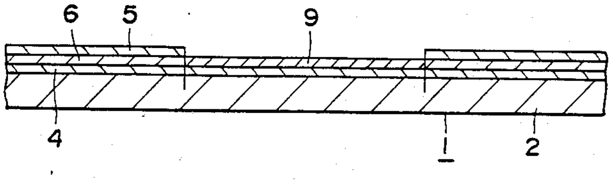
FIG. 6 is an enlarged longitudinally sectioned front elevation of a fourth semi-product in which the peripheral portion of the decorative paper is cut off along the cut.
Figure 7:
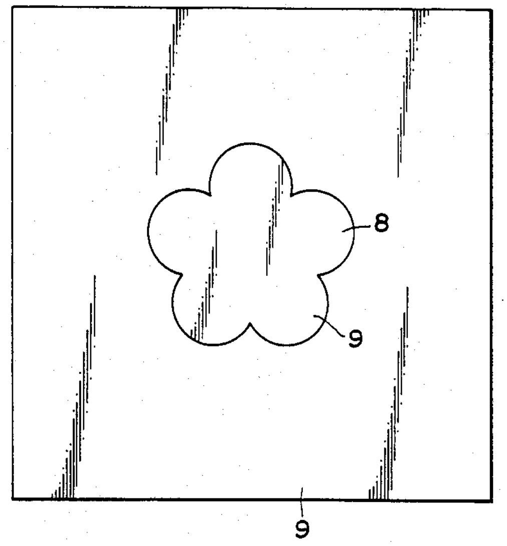
FIG. 7 is a plan view of a decorative plate produced according to the present invention.
Figure 8:
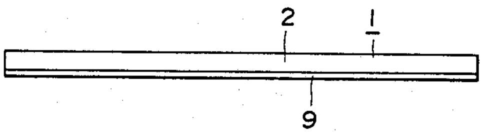
FIG. 8 is a rear elevation of the decorative plate shown in FIG. 7.

Referring to FIGS. 2–4, a cut 7 of a suitable FIG. 8 is made, with cutting dies (not shown) having a contour of the suitable figure, through the release paper 5 and into the upper surface of the substrate 1 to a depth of 1 mm, and the portion of the release paper 5 which is enclosed with the cut 4 is removed as shown in FIG. 7. With reference to FIGS. 5 and 6, after the portion of the release paper 5 is removed, decorative paper 9, preferably Japan paper, is applied to the surface of the portion of the bonding agent which is left exposed after the portion of the release paper 5 is removed. The Japan paper is a special paper made with an irregular mottled effect on the surface. The decorative paper 9 preferably of Japan paper may be selected among figured paper, colored paper, machine-made paper or wax paper, the size of which is slightly larger than that of the FIG. 8. The peripheral portion of the decorative paper 9 is cut off with a dotting punch (not shown), and the fluff occurring at the cut edge of the decorative paper 9 is pressed down into the cut 7 by a free end-pointed groove guide rod (not shown) so as to beautifully finish the FIG. 8. Consequently, a decorative plate having beautiful, semi-cubic FIG. 8 made of the decorative paper 9 of Japanese paper enclosed with the cut 7 is obtained.

The method according to the present invention does not require such advanced techniques as in the conventional pasted picture producing method, in which a figure identical with that on a substrate is drawn on figured paper, and a lot of time. Namely, according to the present invention, a FIG. 8 is cut as a cut 7 in advance in the releasable paper 5 with cutting dies, and, therefore, what should then be done is to merely remove the portion of the release paper 5 which is enclosed with the cut 7, which forms the FIG. 8, from the surface of the substrate 1, and apply the Japanese paper 9 to the surface of the portion of the bonding agent which is left exposed after the mentioned portion of the releasable paper 5 has been removed. This makes it completely unnecessary to carry out a bonding agent applying operation each time. After the decorative paper 9 has been bonded, the peripheral portion thereof may be cut off along the cut 7. Accordingly, no special techniques are required to manufacture this decorated plate, so that children can produce it very easily. According to the present invention, the predetermined FIG. 8 is cut into the surface of the substrate 1 to a very small depth with cutting dies. This enables a decorative plate having a beautiful semi-cubic FIG. 8 formed of the decorative Japan paper 9 enclosed with the cut 7 to be obtained.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention will not be limited to the particular embodiment illustrated by the drawings and described in the specification as the best mode presently contemplated for carrying out this invention, but that the invention will include any embodiments falling within the description of the appended claims.

What is claimed is:

1. Method of producing a decorative plate comprising the steps of:

applying a bonding agent to an upper surface of a substrate to form a bonding agent layer, bonding release paper to the resultant bonding agent layer on said upper surface of said substrate, a lower surface of said release paper being coated with a silicone resin, cutting said release paper, said silicone resin, said bonding agent layer therethrough and said upper surface of said substrate to a small depth to thereby pattern said release paper and said substrate with a predetermined figure, removing a patterned portion of said release paper to form a recessed portion with said bonding agent layer exposed, said patterned portion being enclosed with a cut made by the cutting, applying decorative paper to said bonding agent layer is said recessed portion, cutting said decorative paper along said cut to thereby remove a peripheral portion thereof, and forcing fluff formed at the cut edge of a bonded portion of said decorative paper into said cut formed in said substrate.

2. Method of producing a decorative plate according to claim 1, wherein said decorative paper is Japan paper.

3. Method of producing a decorative plate according to claim 1, wherein said substrate consists of cardboard.

4. Method of producing a decorative plate according to claim 1, wherein said cut is formed with cutting dies.

* * * * *